United States Patent

[11] 3,624,761

| [72] | Inventor | Raymond F. Kohn |
| | | Chicago, Ill. |
| [21] | Appl. No. | 841,392 |
| [22] | Filed | July 14, 1969 |
| [45] | Patented | Nov. 30, 1971 |
| [73] | Assignee | Sara Silverman |
| | | Miami Beach, Fla. |

[54] SAFETY LOCK FOR TRAILER DOORS
2 Claims, 5 Drawing Figs.

[52] U.S. Cl. .................................................. 180/112,
292/241
[51] Int. Cl. ..................................................... B60r 27/00
[50] Field of Search ........................................... 180/112;
292/144, 241, 201; 280/400; 188/21

[56] References Cited
UNITED STATES PATENTS
1,016,836   2/1912   Lewis ............................ 292/201 UX 3,160,433  12/1964  Chieger et al ................ 292/241
FOREIGN PATENTS
1,166,037   3/1964   Germany ..................... 292/201

*Primary Examiner*—Leo Friaglia
*Assistant Examiner*—John P. Silverstrim
*Attorney*—Spector & Alster ABSTRACT: A lock for the door of a trailer to inhibit pilfering from an unattended trailer as when a trailer is in "piggyback" transit by rail or when it is in a yard unattended by a tractor operator, or without an attached tractor. The lock is spring-actuated to its closed position and pneumatically actuated to its open position by air pressure received through the coupling between the tractor and the trailer. The pneumatic unit is substantially completely contained within a housing that is located within the channel of the rear crossmember that supports the trailer.

PATENTED NOV 30 1971 3,624,761
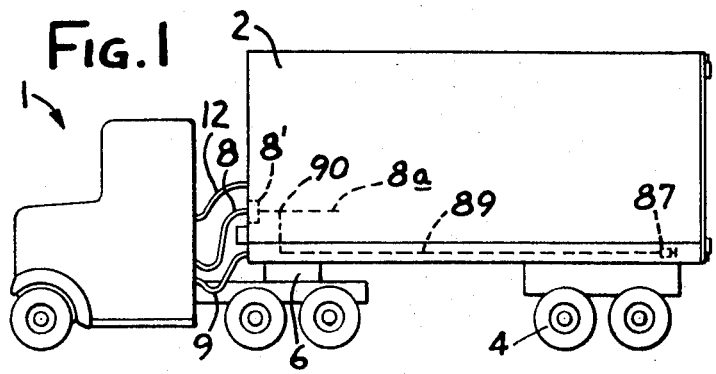
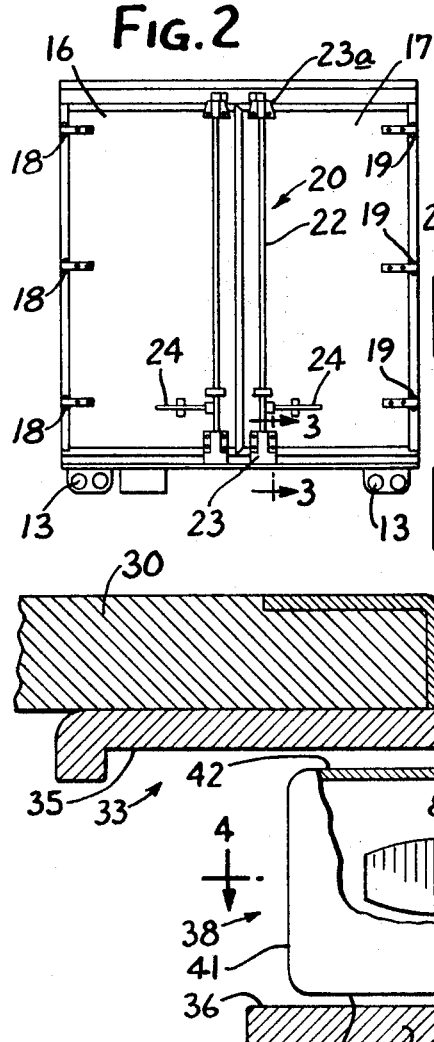
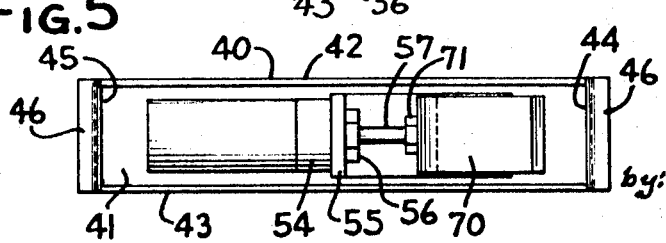
INVENTOR
RAYMOND F. KOHN
by: Spector + Alster
ATTYS.

SAFETY LOCK FOR TRAILER DOORS

This invention relates to apparatus for controlling the opening of a door to a motor trailer or the like. The word "trailer" is used to include a semitrailer.

Truck trailers are frequently burglarized by entry gained through breaking of the usual door locks. This is particularly true when the trailer itself is or has just been transported on a railroad freight car. A trailer on a freight car is subject to pilfering while it is in the freight yard after removal from the railroad freight car.

It is an object of this invention to provide a simple unitary structure that can be incorporated in trailers under construction, or added to most existing trailers, in a simple and economical manner, and which is so located in the trailer structure of the trailer as to be almost inaccessible to pilferers, and which will not interfere with loading or unloading of the trailer.

It is a further object of this invention to provide a unitary assembly that contains substantially all of the lock parts and which assembly can be mounted in a simple manner on the trailer, the assembly requiring for its operation power that a trailer normally receives from its tractor.

The attainment of the above and further objects of this invention will be apparent from the following description taken in conjunction with the accompanying drawing forming a part thereof.

In the drawing:

FIG. 1 is a side view of one conventional type of tractor and its trailer to which the present invention is applied;

FIG. 2 is a rear view of the door of the trailer of FIG. 1;

FIG. 3 is an enlarged sectional view taken along the line 3—3 of FIG. 2 and showing the locking mechanism;

FIG. 4 is a sectional view taken along the line 4—4 of FIG. 3; and

FIG. 5 is a face view of the locking mechanism in its exposed position.

Reference may now be had particularly to the drawing illustrating a preferred embodiment of the invention.

In the drawing, a convention six-wheel motor tractor is indicated at 1, to which is coupled a container or semitrailer 2 by means of a conventional coupler 6 that permits coupling and uncoupling of the tractor from the trailer.

The trailer 2 has a four-wheel truck 4 which has a usual pneumatic braking system that is controlled from the cab of the tractor 1 in the usual manner through releasably coupling airhoses 8 and 9, of which 8 is the service line and 9 is the emergency line. These lines lead compresses air through releasable couplings, one of which is shown at 8', to the usual equipment for controlling the application and release of the airbrakes of the wheels of the truck 4. An additional releasable coupling cable 12 provides a multiwire electrical connection between the tractor and the trailer, whereby the electrical system of the tractor applies voltage, in the usual case 12 volts direct current, to the trailer for controlling from the tractor the on and off condition of the usual signal and safety lights such as 13—13 which are the direction and stop lights of the trailer, and the clearance lights.

The rear of the trailer has doors 16–17 that are hinged at 18 and 19, respectively, for swinging about vertical axes in a door frame. The door 16 is closed first and the door 17 which is closed thereafter overlaps the edge of the door 16 and holds that door against opening until the door 17 has been opened. Each door has a conventional camming arrangement for forcing the door to its fully closed position and latching it in that position, preferably in a manner to prevent racking. This occurs at many times, for instance during humping of a railroad freight car on which the trailer may be carried piggy-back. The door latching structure is generally indicated at 20 and includes an axially rotatable vertical bar 22 suitably journaled in upper and lower plates 23 and 23a on the door and having a handle 24 secured thereto and carrying upper and lower cams that cooperate with keepers mounted on the upper and lower portions of the door frame of the trailer. The plate 23 is secured to the door by round-headed bolts 25, the heads 26 of which may be welded to the door by welds 27, and the shanks of which receive threaded nuts 28. The latching structure on the door 17 is the same as that on the door 16 except that the cams at the upper and lower ends of the respective bars 22 of the doors are respectively right- and left-hand cams. When the door is being closed, the cams at the upper and lower ends of the bars 22 force the respective doors firmly into the door frame of the trailer, compressing peripherally extending moisture-excluding yielding gaskets that are secured to the doors, one of which gaskets being shown at 21. The antiracking door latching structure is illustrated more fully in U.S. Pat. No. 3,160,433 that issued Dec. 8, 1964, to which reference may be had for a more complete description.

In FIG. 3 there is shown at 30 the rear portion of the floor of the trailer, the door 17 being locked closed. At its rear the floor is supported by rear steel crossmember 32 which has a rearwardly facing channel 33 defined by upper and lower flanges 35 and 36. An air pressure operated locking mechanism assembly 38 is mounted below the floor. The locking mechanism assembly 38 includes an integral metal housing 40 having a back 41, top and bottom sides 42 and 43, respectively, and ends 44–45 each having a flange 46. A mount and latch guide 50 is secured to the back 41 as by two screws 51, 51 that extend through elongated slots 52 that allow longitudinal adjustment of the cylinder mount 50. After adjustment, the heads of the screws 51 are welded to the housing to prevent retraction of the screws. An air motor having a cylinder head 54 and a cylinder 54' is mounted on a mounting flange 55 that is part of the mount and latch guide 50, being secured in place by a nut 56. The air motor includes a piston rod 57 that has a piston 58 at its lower end, the piston consisting of a cylindrical disc embedded in a yielding sealing ring gasket 59 that is slidable in and seals against the inner wall of the cylinder 54'. A coiled spring 62 urges the piston rod to its normal position, which is its locking position illustrated in FIG. 4. The piston is retracted by the application of air under pressure through an air inlet port 65 that extends through an opening 66 in the housing 40. An air outlet port 67 is provided for the cylinder.

A locking latch 70 is bolted to the extended end of the piston rod 57 as by nuts 71—71. The mount and latch guide 50 has a guiding plate portion 73 which is an integral part thereof which backs the latch 70 and prevents it from forcing the piston rod 57 laterally towards the back 41 of the housing. The clearance between the latch 70 and the guiding plate 73 is very slight but sufficient to preclude any appreciable friction between the two as the piston is moved inwardly and outwardly of its cylinder.

A locking pin 77 is secured to the locking plate 23 as by a pair of nuts 78—78 that are then welded to the plate as at 79 to prevent removal of the locking pin. The locking pin is of a generally cylindrical cross section bevelled at its inner end as indicated at 80 and having a notch 81 therein for receiving the end of the latch 70. The rear supporting crossmember 32 has a circular opening 84 through which the pin 77 passes as the door is closed. The assembly 38 is secured to the inner surface of the crossmember 32 with the flange 46 bearing against the crossmember and being welded thereto. In this position, the latch 70 is spaced a slight distance (of the order of one thirty-second of an inch) from the inner surface of the crossmember 32 so that there is no objectionable friction between the latch member and that surface as the latch member moves from its retracted to its extended position and yet, if any attempt is made to pull outwardly on the door whereby the locking pin 77 is urged to its outward position, the latch 70 is supported by the inner surface of the flange 32, thereby avoiding any objectionable side forces on the piston rod 57 and its associated piston.

The air inlet port 65 is connected by an air line 86 to a manually operable air switch comprising a valve 87. The valve 87 is spring-biased to its off position illustrated in FIG. 4, where it connects the air line 86 to atmosphere at 85. When the valve is moved to its alternate position by pushing on the knob 88, it connects the line 86 to a pipe 89 that is connected at 90 to the coupling 8' that couples it to the brake air pressure service line 8. The point 90 is between the coupling 8' and the air line 8a that leads to the air service side of the braking system. The trailer coupling 8' is open to atmosphere when the trailer is disconnected from the tractor so that at that time the line 89 is also at atmospheric pressure.

When the door 17 is closed, the locking pin 77 is in the position shown, where it is locked against retraction from the hole 84 by the latch 70, thereby locking the door 17 against opening. Any attempt to force the door open merely forces the latch 70 against the inner surface of the crossmember 32 where the latch 70 firmly holds the locking pin against further retraction, thereby holding the door against opening. To open the door it is necessary first to release the antiracking or latching structure 20. When both doors have been thus unlatched, they still cannot be opened because the door 17 is held locked by the locking pin 77. The locking pin is released by retraction of the latch 70. This is accomplished by applying air pressure to the air inlet port 65. Such air pressure is applied by actuating the valve 87 but this is effective only if air pressure is available, namely if a tractor 1 is at that time coupled to the trailer to supply the air pressure via the line 8. When the latch 70 is retracted, it releases the locking pin and the door 17 then moves in an outward direction under its own resiliency and the outward force exerted thereagainst by the door 16. The requisite amount of outward movement of the door is small, only enough to cause the notch 81 of the locking pin to clear the tip of the latch 70. Thereafter, upon release of the valve 87, the latch 70 rises but cannot enter the notch 81. The trailer doors may then be opened in the usual manner.

During the normal trucking operation, the valve 87 is in the position illustrated in FIG. 4 which disconnects the air motor from the air pressure system. Changes in the air pressure system during braking operations will not cause operation of the piston rod 57. Also, when the trailer is parked and the brakes are maintained in the on position, the pneumatic locking system cannot possible gradually bleed air from the braking system and thereby alter the operation of the braking system.

When the doors are unlocked and open, as hereinabove described, and the tractor is removed from the trailer, the doors may be shut in the usual manner, at which time the locking pin enters the opening 84 and at its nose 80 retracts the latch 70 against the action of the spring 62 until notch 81 is in a position to receive the latch which then returns to the position illustrated in FIG. 4, thereby automatically locking the door against reopening without the application of air pressure thereto.

If desired, the valve 87 may be located in an inaccessible location, and an electromagnetic operator provided for operating it, in which event an electric pushbutton switch would be placed on the outside of the trailer in a conveniently accessible place, namely at the place indicated for the air valve switch 87 in FIG. 1, which electric pushbutton would actuate the electrically operated pneumatic valve. Such operation would derive its power via the electric line 12 which receives its electric power from the 12-volt system of the tractor. In such an arrangement, in the absence of a tractor, a pilferer would require not only air pressure but also a source of 12-volt direct current, neither of which is generally available to the usual pilferer.

The precise constructions herein shown are merely illustrative of the principles of the invention.

What is considered new and sought to be secured by Letters Patent is:

1. A truck trailer comprising a closed body having an entrance door and having power brakes and coupling means for coupling the trailer to a tractor and for coupling it to a source of pneumatic power at the tractor, hand-operated means for opening and closing the door, and a pneumatic lock for locking the door against opening, said lock including a casing, a pneumatically operated latch in the casing, said casing being mounted on the trailer below the floor thereof, a plate secured to the door and extending below the trailer floor, said plate having a locking pin secured thereto below the trailer floor and in the door closed position extending into the casing for engagement by the latch, said pin and latch having cooperating means whereby the movement of the pin to its door closed position brings the latch into locking engagement with the pin, whereby the latch holds the pin against withdrawal, said latch having a locking position and a retracted release position, spring means for biasing the latch to its locking position, a pneumatic motor in the housing for moving the latch to its retracted position, and backing means supporting the latch against lateral movement to prevent the latch from transmitting to the pneumatic motor lateral forces that may be imposed thereon by the pin, a beam supporting the trailer floor below the door opening, said casing being mounted on the front side of the beam and said pin being movable through an opening in the beam into and out of the casing as the door is opened and closed.

2. A structure as defined in claim 1 wherein the latch is backed by said beam for supporting the latch against lateral forces resulting from attempted opening of the door and retraction of the pin while the latch is in its locking position.

* * * * *